Nov. 3, 1931.  H. C. PARKER  1,830,333
CONTROL METHOD AND APPARATUS
Filed July 7, 1928    3 Sheets-Sheet 1

INVENTOR
Henry C. Parker
Cornelius D. Ehret
His ATTORNEY

Patented Nov. 3, 1931

1,830,333

UNITED STATES PATENT OFFICE

HENRY C. PARKER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL METHOD AND APPARATUS

Application filed July 7, 1928. Serial No. 291,103.

My invention relates to a method of and apparatus for effecting a control of a variable condition with respect to a predetermined standard, and more particularly for effecting an anticipatory control tending to maintain substantially constant any desired electrical, thermal, chemical or physical condition.

In accordance with my invention, a control is effected to anticipate the degree of departure of a condition from a predetermined standard and to restore said condition to its normal value by diminishing the degree of said departure.

Further in accordance with my invention a control is effected during a time interval approximately proportional to half of the time of departure of the condition from its predetermined or normal standard, and in opposition to the influences causing said departure.

Further in accordance with my invention, a control effected in response to said departure is rendered inactive at substantially the point of maximum departure of said condition from its predetermined standard.

Further in accordance with my invention, a control is effected by varying the addition of an agent for controlling the condition in amount of degree proportional to the time lag of the system.

Further in accordance with my invention, a control is effected by the application of a control agent, in degree or amount proportional to the time lag of the system, only during a period prior to and including the point of maximum departure of said condition from its predetermined standard.

Further in accordance with my invention, a control is effected by the application of a control agent tending to increase the magnitude of a condition during a period in which the magnitude of the condition is decreasing but is still too high and is decreasing and is too low.

Further in accordance with my invention, a control mechanism responsive to variations in said condition is adapted to actuate governed means through a lost motion or non-positive connection for controlling the application of said agent.

Further in accordance with my invention circuit controlling means for governing the application of said agent are mounted on a member freely rotatable between predetermined limits with respect to a control mechanism.

My invention further resides in a method and apparatus of the character hereinafter described and claimed.

My invention relates to control systems of the type usually met in practice, having an appreciable time lag between the operation of a control and its subsequent detection by means governing the control. In other words, the application of a control agent for varying some physical, chemical or electrical condition may require a certain amount of time to have such general effect, that means responsive to such effect are not actuated immediately upon application of the agent.

The problem of designing a control system without the objectionable "hunting" or "overshooting" often encountered, has resulted in many different types of control systems and apparatus, but they are generally not suited for all conditions of operation in that the apparatus is often expensive and difficult to put into practical use.

One of the more common types of control is known as the "on-off" control which simply controls application of an agent to correct the condition, depending on the relation of the condition to its predetermined standard. Since in this case the application of the control agent continues approximately up to the point where the condition is normal, it will be clearly evident that "hunting" or "overshooting" will result due to the inertia, or time lag of the system. If, however, the application of the control agent should be discontinued at some point before the condition reaches its normal value, and if this displacement is made approximately equal to the time lag of the system, the effect of the time lag would be practically counter-balanced by such displacement, and the control apparatus would function more nearly in response to the actual value of the controlled condition.

For further illustration of my invention, and one of its applications, reference is to be had to the accompanying drawings in which.

Figure 1:
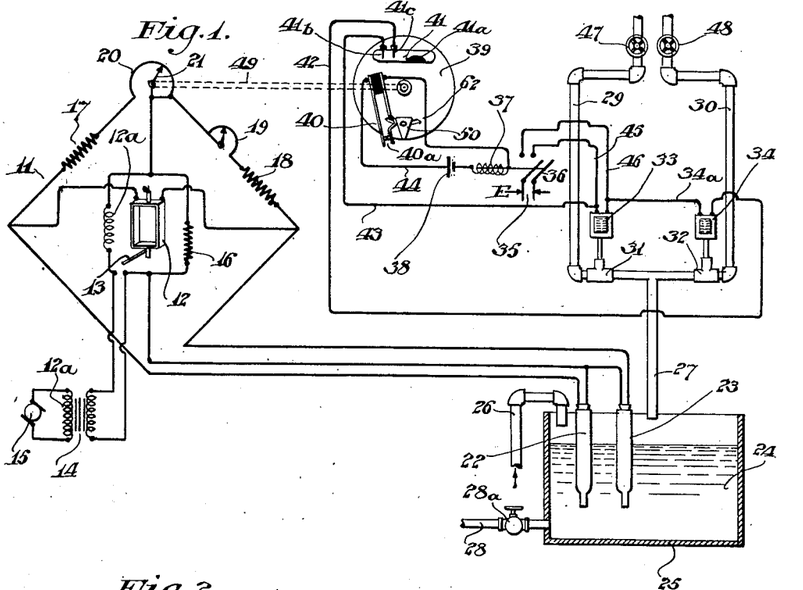
Fig. 1 shows my invention in connection with a two solenoid valve system for controlling ion concentration.

Referring to Fig. 1 in which my invention is applied to a system for controlling ion concentration of a solution, a Wheatstone bridge 11, or equivalent electrical balancing circuit, has resistances 17 and 18 disposed in adjacent branches of the bridge while in the opposing branches are cells 22 and 23 respectively. Cells 22 and 23 are disposed in a solution 24, whose ion concentration is to be controlled. Cell 22 may be of the constant resistance type, while the resistance between the electrodes of cell 23 varies in accordance with changes in ion concentration. Associated with the Wheatstone bridge is galvanometer 12 having a field coil 12a and a pointer or deflecting member 13 connected thereto. The Wheatstone bridge is energized through transformer 14 from the source of alternating current 15. The resistance 16 of suitable value is in series with transformer 14 and galvanometer coil 12a, the drop in potential across resistance 16 supplying the electromotive force for the bridge. Variable resistance 19 may be connected in series with fixed resistance 18 in order that the circuit may be adapted for a varying range of control. Movable contact 21 co-operates with slide wire resistance 20 so that the bridge may be balanced in spite of varying resistance of cell 23 by adjusting contact 21.

Mechanically connected to movable contact 21 by shaft 49 is a control disc 39. Member 39 has mounted thereon a mercury contact switch 41 in which a globule of mercury 41a is adapted to bridge contacts 41b and 41c of the switch in certain positions thereof. Mounted also on disc 39 is switch 40 having two resilient contact supports for co-operating contacts 40a. Contact operating member 50 is movable with respect to disc 39 within certain limits and is therefore adapted to close contacts 40a when disc 39 moves in counter-clockwise direction.

Figure 2:
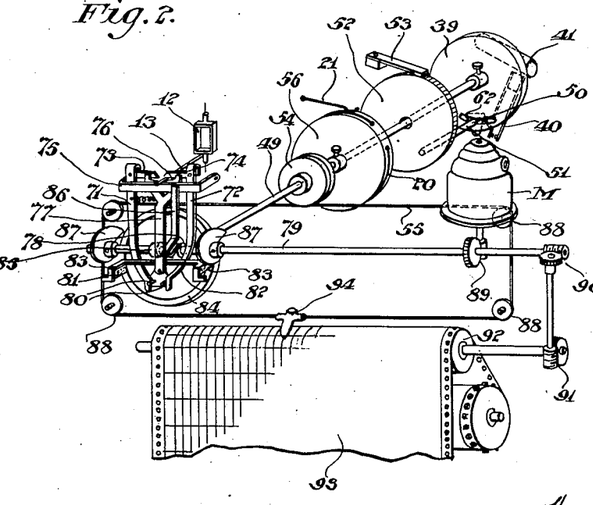
Fig. 2 shows control apparatus which may be used in accordance with my invention.

A better understanding of the operation of control disc 39 may be obtained by referring to Fig. 2, in which galvanometer 12 and deflecting member 13 co-operate with control mechanism for rotating disc 39 in a direction depending upon the degree of control desired. If the resistance of cell 23 does not correspond with the predetermined value desired, it will be apparent that galvanometer 12 will cause deflection of member 13 in a direction depending upon whether the resistance of cell 23 is too high or too low. Pivoted members 71 and 72 having extensions 73 and 74 respectively, extending towards pointer 13, but spaced from each other, are adapted to be individually pivoted when pointer 13 moves in such position that it is underneath one of said extensions. When in this position pivoted U-shaped member 75 is moved upwardly through its arm 77 by cam 78 secured to shaft 79. Shaft 79 is rotated by constant speed motor M through gearing 89 and has also mounted thereon cam 85 for periodically moving member 86 in an outward direction, and cams 87 for a purpose hereinafter described. Pivotal movement of either arm 71 or 72 causes such respective arm to engage one of the pins 80 secured to member 83 which is pivotally mounted on the lower end of member 86. Transversely positioned member 82 is attached to member 81, such that it will be moved away from its horizontal position due to pivotal movement of either arm 71 or 72. Since member 82 frictionally bears through shoes 83 against clutch disc 84, cam 85 is timed with respect to cam 78 so that shoes 83 will be disengaged from clutch disc 84 during pivotal movement of arm 71 or 72. However, upon engagement of shoes 83 with disc 84, transverse member 82 will have been shifted from its horizontal position due to pivotal movement of either 71 or 72 such that one of the cams 87 will engage that offset extremity of member 82 which is in highest position. Clutch disc 84 and consequently shaft 49 will therefore be rotated to an extent dependent upon the angle through which member 82 has been shifted, which in turn is dependent upon the degree of deflection of galvanometer 12.

Motor M also operates through gearing 90 and 91 a recorder cylinder 92 which moves chart 93 with respect to pen 94. Shaft 49 has mounted thereon grooved wheel 54 around which extends flexible member 55, guided by pulleys 88, for supporting and moving the recording pen 94. Secured also to shaft 49 is disc 56 having slide wire resistance 20 mounted thereon co-acting with contact 21. Associated with shaft 49 is idler disc 52 freely mounted thereon and having a resistance brake 53 engaging its periphery. Member 51 is supported by and fixed with relation to idler disc 52, and extends through slot 62 in circuit controller disc 39 which is fixed with respect to shaft 49.

Figure 3:
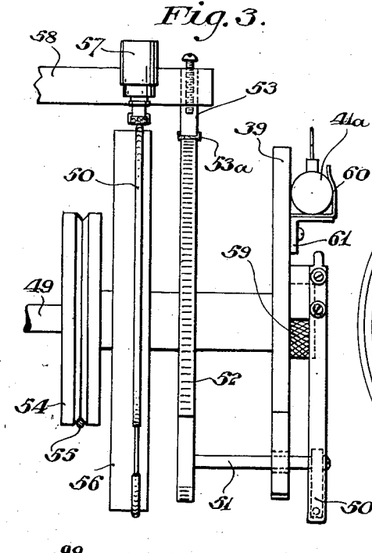
Fig. 3 is an elevational view of circuit controlling means used in connection with my control apparatus.
Figure 4:
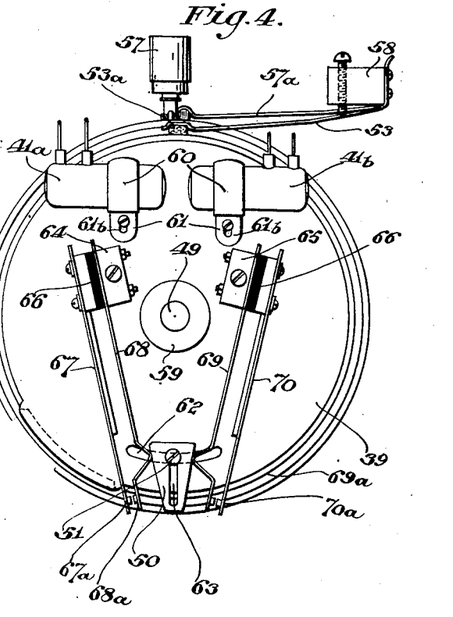
Fig. 4 is an elevational view of the apparatus shown in Fig. 3 in another position.

Reference is to be had to Figs. 3 and 4 for a more detailed illustration of the structural features of co-operating discs 52 and 39. As shown in Fig. 3, shaft 49 is common to discs 56 and 39 and secures disc 39 to its outer end by tightening nut 59. Support 58 carries resilient arm 57a, in turn supporting means 57 for oiling slide wire resistance 20. Mounted on the same support is flexible member 53 having a frictional element 53a engaging directly upon the periphery of disc 52 which is rotatable with respect to shaft 49. Directly mounted on disc 52 is rod 51 extending beyond disc 39 through slot 62 therein, and terminating in contact engaging member 50 which is adapted to be adjusted with respect to its support 51 by means of slot 63. As shown in the present instance, disc 39 has two mercury switches and two resilient contact switches mounted thereon, but it is of course understood that the construction may readily be as indicated in Fig. 1, wherein a single mercury switch and spring contact switch are employed. The resilient contact supporting members 67, 68 and 69, 70 are mounted on supports 64 and 65 respectively, which are in turn bolted or otherwise secured to disc 39. Insulating members 66 insulate co-operating contacts from each other at their point of support.

Mercury switches 41a and 41b, mounted in spring clips 60 may be adjusted individually by shifting brackets 61, to which spring clips 60 are secured, with respect to its securing screw within slot 61b. By such adjustment switches 41a and 41b may be adjusted at different angles with respect to the horizontal diameter of disc 39, so that the respective contacts of said switches may be bridged by the mercury at different angular positions of the disc.

It will be apparent, referring to Fig. 2, that as shaft 49 continues rotation in one direction contact engaging member 50 which is secured to idler disc 52, will hold one pair of co-operating contacts in engagement, and that at the moment reverse rotation begins, member 50, which will remain stationary at this point due to the action of friction element 53, will permit the said contacts to immediately open, as disc 39 will be moving them away from, instead of towards said member 50.

Referring again to Fig. 1 a container 25 is supplied by constant flow of water and acid through conduits 26 and 27 respectively. The resultant solution 24 may be drawn off through conduit 28 having regulating outlet valve 28a. Conduit 27 is supplied from two separate branches 29 and 30 having solenoid valves 31 and 32 respectively located in said conduits at a point below manually operated valves 47 and 48 respectively. Valves 31 and 32 are controlled by solenoids 33 and 34 respectively, which may be either energized or de-energized concurrently, or one valve may be energized while the other is de-energized.

The method of operation of the system shown in Fig. 1 is as follows:

Assuming that the ion concentration of solution 24 is below the predetermined or desired value, the variation in resistance across the terminals of cell 23 will unbalance the Wheatstone bridge, thereby causing deflection of galvanometer 12 in a direction which indicates low concentration of the solution. Deflecting member 13, through the disengageable mechanical connection previously described, effects rotation of clutch disc 84 and operating shaft 49 in a direction which is determined by the deflection of pointer 13. Rotation of shaft 49 will therefore tend to adjust slide wire resistance 20 at a value which will balance the bridge at the actual value of the concentration, rather than at its predetermined value. Simultaneous with adjustment of slide wire 20 control disc 39 rotates in such direction as to bring a notched portion of one of the resilient contact arms of switch 40 into engagement with the idler stop 50 so as to close contacts 40a. As disc 39 continues to rotate in this direction contacts 40a will be maintained in closed position due to the continuous pressure exerted by the switch upon member 50. Upon closure of contacts 40a a circuit is closed through conductor 44, source of power 38, and relay 37, thereby energizing said relay and closing switch 36. This operation connects valve energizing solenoid 33 to a source of power 35, and valve 31 is consequently opened, allowing flow of acid through conduit 27 to increase the ion concentration of solution 24. Upon continued rotation of disc 39 in the same direction, which in the present instance is counter-clockwise, mercury switch 41 will tilt at such an angle that the body of mercury 41a will bridge contacts 41b and 41c, thereby completing the circuit consisting of conductor 42, valve operating solenoid 34, conductor 34a, conductor 46 to one terminal of source 35, the circuit being completed through conductor 45 and conductor 43 to contact 41b. Therefore as control disc 39 rotates in such direction as to indicate decreasing concentration, contacts 40a will be maintained in closed position for energizing solenoid 33, which keeps valve 31 in open position. Upon further angular displacement of control disc 39 in the same direction, mercury switch 41 will close to effect energization of solenoid 34 and opening of valve 32, the extent of such angular displacement before switch 41 closes depending, of course, upon the initial adjustment of the mercury switch as previously explained.

Figure 7:
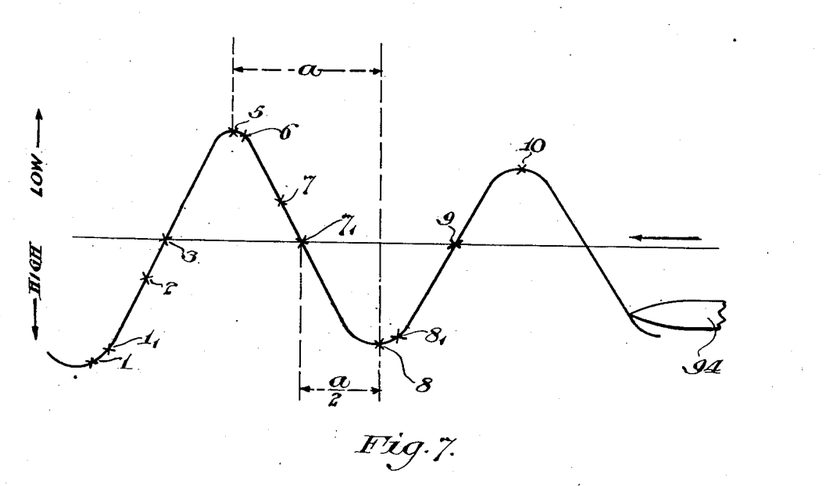
Fig. 7 shows a chart or record of a condition under control subject to anticipatory control.

Referring to Fig. 7 which, for the purpose of illustration shows an exaggerated shape of the control record, the direction of the arrow indicates the direction of movement of the chart. The portion of the curve below the base line represents high concentration while that portion above represents low concentration, the base line itself being representative of the predetermined control value. Therefore at substantially point 1 on the record, contacts 40a will close and effect opening of valve 31. The opening of such valve may bear a suitable predetermined relation to the opening of valve 32 so that the condition will not be entirely corrected by the opening of valve 31. At substantially point 3, mercury switch 41 will close, thereby effecting opening of valve 32 and increasing the flow of acid through conduit 27 as the concentration continues to decrease. Both valves 31 and 32 will remain open until control disc 39 begins reversal of movement, thereby indicating that the concentration has reached its low value and has started to increase again. At substantially point 5 therefore, contacts 40a will open, de-energizing solenoid 37 and opening switch 36, which in turn by de-energizing solenoids 33 and 34, permits valves 31 and 32 to close. Valves 31 and 32 may be moved to closing position either through gravity or suitable biasing means. As the concentration continues to increase both valves 31 and 32 will remain in closed position until the point of maximum concentration has been reached, and upon reversal of the control mechanism, valve 31 will open again at substantially point 8 and the previously described cycle of operation repeated. It will be apparent therefore that the application of acid to increase the concentration at a low rate when the concentration is too high, but is decreasing, while an increase in the rate of application after the concentration has become too low and is still decreasing, will act to diminish the degree of departure of the concentration from its predetermined value, and will tend to restore it to a value very close to the same.

Figure 5:
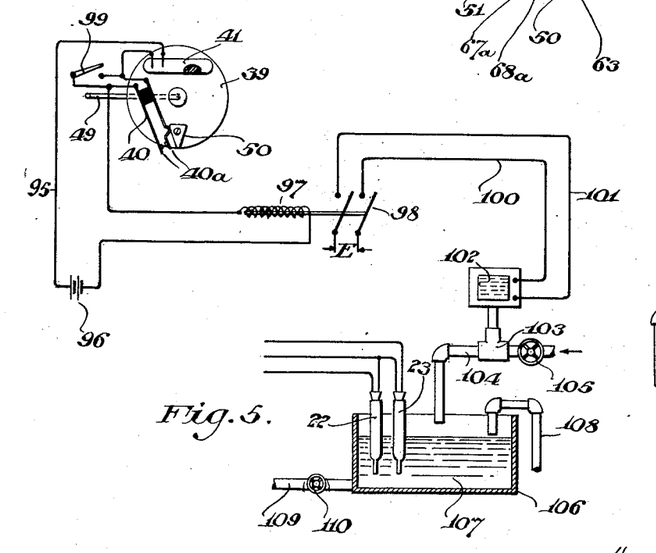
Fig. 5 shows my invention applied to a single solenoid valve for controlling ion concentration.

Fig. 5 shows my invention applied to a single solenoid valve for regulating the degree of concentration of a solution. Control disc 39, as in Fig. 1, has mounted thereon mercury switch 41 and spring contact switch 40 co-operating with stop 50 secured to the idler disc. Switches 40 and 41 are connected in series so that the circuit through conductor 95, source of power 96 and solenoid switch actuating means 97, will be interrupted when either switch is open. If desired, a short-circuiting switch 99 may be connected across switch 40 so that such switch may be closed and switch 40 short-circuited when the apparatus is to be first started. Such operation would be of the ordinary "on-off" type previously referred to.

The method of operation is as follows:

Assuming as in the former instance that solution 107 is decreasing in concentration, cell 23 in response thereto will effect unbalancing of the Wheatstone bridge and rotation of control disc 39 in a counter-clockwise direction. As before, contacts 40a will close, but the circuit will not be closed through solenoid 97 until switch 41 which is in series with contacts 40a has also closed, which may be in proximity to position 3 of Fig. 7. Energization of relay 97 closes switch 98, energizing solenoid 102 through conductors 100 and 101 from a source of power E. Energization of solenoid 102 opens valve 103, permitting acid to flow through conduit 104, subject to predetermined regulation by hand-operated valve 105 disposed in a position ahead of valve 103. A water supply is led to container 106 through conduit 108, while conduit 109 having valve 110 therein is adapted to drain off the solution as desired.

In the operation of the single solenoid valve illustrated in Fig. 5, the most accurate control may be obtained by adjusting mercury switch 41 on control disc 39 such that it closes the circuit at substantially point 3 on the chart of Fig. 7. In this case, the amount of application of the control agent will be proportional to the time required for the condition to change from its predetermined value to its maximum departure from said valve, the valve, of course, closing at substantially point 5.

If the valve were opened at, say point 2, it would indicate that manually controlled valve 105 was not open wide enough and would cause the record to "overshoot" too far on the low side. When valve 105 is open at its proper point, the record is practically symmetrical about the point at which the mercury switch operates, and since the accuracy of the control desired depends upon such symmetry with respect to the predetermined value of the condition desired, it is evident that point 3, indicating the position at which mercury switch 41 operates, should coincide with the base line of Fig. 7, which, in turn, represents said predetermined value.

It is possible to shift the point of operation of contacts 40a, indicated by point 1 on the record, by adjusting stop member 50 in a vertical direction through its slot 63. This adjustment increases the distance from the outwardly bent portion of the contact arm to be engaged by stop 50, such that greater relative movement of disc 39 with respect to idler disc 32 is necessary before contacts 40a are closed. This last adjustment, although making no difference in the operation of the system shown in Fig. 5, would permit closure of valve 31 shown in the system of Fig. 1 at a different position on the record such as point 1', for instance.

Referring again to Fig. 5, valve 103 remains in open position until reversal of rotation of disc 39 has occurred, thereby indicating that the concentration has begun to increase in value. At substantially point 5 on the record contacts 40a will open, thereby de-energizing solenoid 97 and opening switch 98 which in turn de-energizes solenoid 102 and permits valve 103 to close. Valve 103 remains closed while concentration is increasing and upon reversal of the condition at point 8 the previous cycle is repeated.

The application of the control agent in this instance will therefore be proportional to the time required for the concentration to pass from substantially its normal value to its maximum departure, as in the direction of low concentration. This is due to the fact that valve 103 is either fully open or fully closed, and that when in the open position the flow of the control agent through conduit 104 is at a constant velocity and is proportional in amount therefore to the time during which valve 103 is open. It will be apparent, therefore, that the actual degree of departure of the concentration from its predetermined value does not affect the amount of application of the control agent.

Figure 5A:
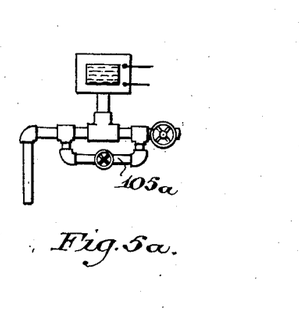
Fig. 5a illustrates the use of a by-pass in connection with the solenoid valve shown in Fig. 5.

Under certain conditions a by-pass 105a may be used in connection with valve 103 as indicated in Fig. 5a. However, where conditions require wide fluctuations in flow, a by-pass is not practical since the capacity of the by-pass must bear such ratio to capacity of conduit 104 that it will carry the minimum flow required by itself. That is, if the flow should fluctuate within the limits 1 to 3, the by-pass should have a capacity one-third of the capacity of conduit 104 so that the by-pass would provide for the minimum requirements when valve 103 is entirely closed. If, however, the flow should vary within the range of 1 to 10, the capacity of the by-pass would be too small to appreciably aid in the control. A further disadvantage of the by-pass is that a manually operated valve would probably be used as indicated at 105a, to close the same during periods when the plant is shut down. This introduces an element of error as the by-pass might be left open after solenoid valve 103 is closed, which would result in waste or possible damage to the plant.

Figure 6:
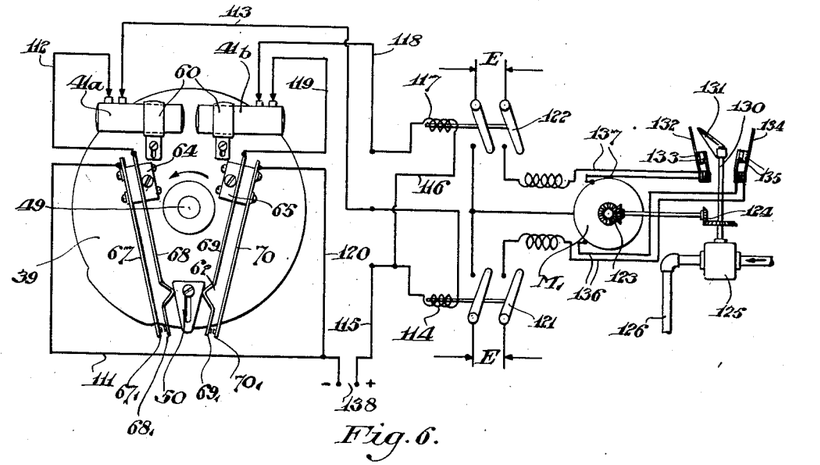
Fig. 6 shows my invention applied to a reversible motor-operated valve.

Fig. 6 shows my invention applied to a reversible motor controlled valve. Since in this case it is necessary that the valve be positively energized in both directions, control disc 39 has two mercury switches 41a and 41b, and two spring contact switches 67—68 and 69—70 mounted thereon, as illustrated in Fig. 4. Switches 41a and 67—68 are connected in series as are switches 41b and 69—70. When the circuit is completed through a pair of the switches in series, either solenoid 117 or 114 will be energized, depending upon the position of control disc 39. For instance a circuit is completed from the negative terminal of source of power 138 through conductor 111, switch arm 67, contacts 67' and 68', switch arm 68, conductor 112, mercury switch 41a, conductor 113, relay 114, conductor 115 to the positive terminal of said source. The circuit is completed through the opposite pair of switches, beginning with the negative terminal of the source from conductor 120, contact 69', 70', conductor 119, mercury switch 41b, conductor 118, relay 117, and conductor 116 to the positive terminal of the source. Relays 117 and 114 comprise electromagnetic switch actuating means for switches 122 and 121 respectively. These switches are adapted to energize a reversible motor M1 from a source E in either direction, depending upon which switch is closed.

A valve 125 is disposed in conduit 126 through which passes a control agent as previously described. Valve 125 is connected through suitable gearing 123 and 124 to the reversible motor M1, so that positive opening and closing movement of the valve may be effected by said motor. In order to insure operation of the reversible motor within safe limits, limit switches are provided which operate in response to position of valve 125. By way of illustration, the valve shaft may have an extension as 130 carrying thereon an arm 131 which is adapted to engage either spring arm 132 or 134, depending upon the extent of rotation of shaft 130. When arm 131 engages resilient switch arm 132, for instance, contacts 133 will separate and the motor will be de-energized with respect to further movement in the same direction. Hence the valve actuating mechanism may be de-energized at predetermined positions of valve 125.

When the above described motor-operated valve is used in connection with the on-off type of control, the change in rate of flow through valve 125 will take place during a period which is substantially twice as long as in the case of the present system. In other words, referring to Fig. 7, the valve will start opening at substantially point 3, since the concentration has begun to drift over to the low side, and will continue to open during the entire period in which the concentration is on the low side, i. e. up to point 7'. After point 7' has been passed, and the concentration starts toward the high side of the record, the valve will start closing and will continue to do so until point 9 has been reached. It will therefore be apparent that at point 7' the valve is at its maximum opening, and at point 9 it is at its minimum opening. The correct opening of the valve for maintaining the condition substantially at its predetermined value, is evidently half way between the maximum and minimum positions of the valve. These positions occur at points 5 and 8 on the record, and if the motion of the valve is interrupted at these points during opening and closing movements respectively, the valve should then be in such position as to effect the required application of the control agent for substantially maintaining the condition at its predetermined value.

This is accomplished by the two pair of switches mounted on the control disc in the manner previously described.

The method of operation is as follows:

Assuming as in the previous instance, that the condition, and more particularly ion concentration, has started to decrease in magnitude, control disc 39 will have reversed its direction of rotation and will rotate in counter-clockwise direction. Contacts 67', 68' will close upon such reversal as at point 1', and after a predetermined interval of time mercury switch 41a will also close, as at point 2 on the record of Fig. 7, thereby completing the circuit through relay 114. Energization of relay 114 closes switch 121, thereby energizing motor M1 in such direction as to start opening movement of valve 125. When valve 125 has reached a predetermined open position, limit arm 131 engages resilient contact arm 134, separating contacts 135 and breaking the motor circuit. It will be apparent that valve 125 may be rapidly opened through suitable gearing if desired, or it may be opened at a comparatively slow rate so that the rate of application of the control agent will be constantly increasing. The position on the record at which mercury switch 41a closes will therefore depend on the rate at which the valve opens. The preferred rate of operation of the valve is such that mercury switch 41a closes at point 3 on the record, and the valve reaches its maximum opening at substantially point 5.

Referring again to Fig. 7 valve 125 will remain in maximum open position until at least the point of maximum departure of the concentration from its predetermined value has been passed. As the concentration begins to increase, the rotation of the control disc will reverse in direction and the circuit will be immediately broken through contacts 67', 68' and relay 114, permitting switch 121 to move to open position and break the motor circuit, in case limit switch arm 131 has not already done so. Contacts 69' and 70' will close shortly after the opening of contacts 67', 68' at substantially point 6, and within a predetermined interval mercury switch 41b will also close, as at point 7, completing the circuit through relay 117, closing switch 122 and energizing motor M1 to rotate valve 125 toward closed or such position allowing predetermined minimum flow through conduit 126. When this position has been reached, limit arm 131 engages resilient arm 132, thereby separating contacts 133 and breaking the motor circuit. As in the previous instance, however, the rate of closing of valve 125 is preferably such that the minimum opening is reached substantially at point 8, which is the point of maximum departure in the opposite direction. Under such conditions, the limit switch serves simply as an added safeguard, and is not actuated unless, due to some unforeseen disturbance in the system, the control "overshoots" to a considerable degree.

During a series of investigations, I have found that by the use of a single solenoid valve as shown in Fig. 5, the accuracy of the control obtained is increased in the ratio of about 2.4 to 1 over that obtained with the usual "on-off" type of control previously referred to. Where a by-pass is used, and fluctuations in demand are relatively small, the accuracy may be further increased. However, the use of a by-pass is limited as previously brought out, by the variations in flow of the control agent. By the use of the two solenoid valve system as illustrated in Fig. 1, the variations in the condition under control are still further reduced in a ratio of about 1.9 to 1, and when the same system is used in connection with a slightly underdamped galvanometer needle, a very satisfactory type of control may be obtained with solenoid valves, even in case there is but small opportunity for mixing or equalizing of the control agent in the solution or other control medium.

It will be noted in the case of the solenoid valves, that the amount of application of the control agent has nothing whatever to do with the degree of departure of the condition from its predetermined standard. The control is thus proportional neither to the rate of change of the control condition, nor to the instantaneous deviation from the desired flow, but is proportional only to the time required for the control condition to pass from substantially a desired or predetermined value to its maximum departure.

Referring to Fig. 7, the distance $a$ along the time axis may be considered as the time lag of the system. In other words as the application of the control agent is discontinued at substantially point 5, the condition, as recorded by the control apparatus, nevertheless continues to increase in magnitude to substantially point 8, after which it again starts decreasing in magnitude. The effect therefore of this increasing magnitude of condition, although application of the control agent has been discontinued, is due to the inertia of the system itself, which might be properly termed its time lag.

When the system employing two solenoid valves as illustrated in Fig. 1 is used, hand operated valves, 47 and 48, may be used to advantage in connection with their respective co-operating solenoid valves. For example, auxiliary valve 31 may have the flow therethrough when opened adjusted to such predetermined extent by valve 47, that at the minimum demand and when the condition is above its predetermined magnitude, the magnitude of the condition will gradually drift to lower values. Main valve 32 may also have its maximum flow adjusted by valve 48 such that at full demand and when the condition is at low magnitude, the magnitude of the condition will gradually drift toward higher values. By such adjustment it is obvious that my system of control may be readily adapted for widely different rates of demand.

When a motor operated valve shown in Fig. 6 is used to control application of the control agent, the time lag, or inertia of the system will not be equal to $a$, but will equal $$\frac{a}{2}.$$

This will be apparent after an inspection of Fig. 7.

Assuming that one of the mercury switches closes at point 3 to complete the circuit and energize motor M1, the valve will start opening, and will continue in such movement until about point 5. At this point reversal of the control disc will de-energize the motor and leave valve 125 at its maximum opening. The valve will remain in such position up to approximately point 7', at which point the other mercury switch will close the circuit through the motor, which will start rotating the valve towards minimum opening. Such closing movement will continue up to about point 8, beyond which reversal of control disc de-energizes the motor, thereby permitting valve 125 to remain at minimum opening to about point 9 where the cycle start to repeat again.

Thus, as the valve starts opening movement at point 3, the record will indicate this additional flow at point 5, and the time lag between the institution of such control and its detection by the control apparatus will be substantially $$\frac{a}{2}.$$

In the same way, the closing movement of the valve which starts at point 7' is detected by the record at point 8.

If the mercury switches on the control disc are adjusted at such angles that they operate at points 2 and 7 on the record, instead of at point 3 and 7' respectively, the maximum points of departure on both sides of the record may be decreased. In other words, the degree of departure from point 2 will be substantially equal to the departure from point 3 to point 5, thereby bringing the point of maximum departure nearer to the base line. In the same way the departure on the high side of the record from point 7 will be substantially equal to the departure between points 7' and 8. This indicates that the degree of departure in either direction from the predetermined value may be diminished by proper adjustment of the mercury switches on the control disc. When the motor operated valve is used so that closing of the mercury switches occurs at substantially the point where the record crosses the base line, the period of control will correspond almost exactly to the time lag of the system. In both methods of operation described, however, the control period takes place within a time interval which is substantially equal to the time lag of the system.

An important advantage of my control system is that the amount of application of the control agent may vary with respect to the control cycle. The inertia, or time lag of the system may be therefore anticipated to an extent approximately proportional to the magnitude of said inertia or time lag, so that the resultant control is free to a large extent from "hunting" or "overshooting", which is a common occurrence in many control systems in which the inertia or time lag of the system is not anticipated.

It will be understood that my invention is not limited to the control of ion concentration, the same being described and illustrated merely for the purpose of showing one form which my invention may take. It is apparent that my invention may be utilized to control any condition, either physical, electrical or chemical, in which a control agent is employed to vary the magnitude of the condition with respect to a predetermined standard, and wherein there is an appreciable time lag between the application of such control agent and the resultant effect, in response to which further control is effected.

What I claim is:

1. A method of control for anticipating the change of a condition from a predetermined or normal standard and maintaining substantially constant said condition, which comprises varying prior to maximum departure of said condition from said predetermined standard the addition of an agent controlling said condition in amount or degree proportional to the time lag of the system.

2. A method of effecting anticipatory control of a condition which comprises varying the addition of an agent affecting said condition in amount or degree proportional to the time lag of the system, and discontinuing the application of said agent at substantially the maximum departure of said condition from a predetermined standard.

3. A method of effecting anticipatory control of a condition which comprises varying the application of an agent controlling said condition in amount or degree proportional to the time lag of the system, and during a time interval of between a quarter cycle and a half cycle of said control.

4. A method of effecting anticipatory control of a varying condition with respect to a predetermined standard which comprises applying an agent tending to correct said condition during a time interval which is approximately half of the time of departure of the condition from the predetermined standard.

5. A method of effecting anticipatory control of a condition with respect to a predetermined standard which comprises applying an agent tending to correct said condition, said application beginning at a point in proximity to the departure of said condition from its predetermined standard and continuing to approximately the point of maximum departure.

6. A method of effecting anticipatory control of a condition varying between values in excess and below a predetermined standard, which comprises varying the application of an agent tending to restore said condition to its predetermined standard during a period of time corresponding to approximately one-quarter cycle of the variation of said condition.

7. A method of effecting anticipatory control of a condition with respect to a predetermined standard which comprises applying an agent to increase the magnitude of said condition when said magnitude is decreasing but is still too high and continuing the application of said agent until the magnitude of said condition is increasing but is still too low with reference to the predetermined standard.

8. A method of effecting anticipatory control of an ion concentration of a solution with respect to a predetermined standard which comprises varying the application of an agent tending to change the magnitude of said concentration and to restore said concentration to its normal value during a period of time corresponding to approximately one-quarter cycle of the variation of said concentration.

9. A method of effecting anticipatory control of a varying condition, either electrical, thermal, chemical or physical, with respect to a predetermined standard, which comprises varying the application of an agent to change the magnitude of said condition, said application being proportional in amount to the time of departure of said condition from its normal value but independent of the degree of departure of said condition from its normal value.

10. A method of effecting anticipatory control of an ion concentration of a conducting solution which comprises adding an agent to increase the ion concentration of the solution when the concentration is decreasing but is still too high and continuing the application of said agent until the concentration is increasing but still too low.

11. A method of effecting anticipatory control of an ion concentration of a conducting solution with respect to a predetermined standard which comprises adding an agent to increase the ion concentration of the solution only during a period when said concentration is decreasing in magnitude, said addition being proportional in amount to the time lag of the system, and independent of the degree of departure of said concentration from its predetermined standard.

12. A method of effecting anticipatory control of an ion concentration of a conducting solution which comprises applying an agent affecting the degree of concentration of said solution during a time interval which is proportional to the time lag of the control, the amount of application of said agent being independent of the degree of departure of said concentration from the predetermined standard.

13. A system for effecting anticipatory control of any desired electrical, thermal, chemical, or physical condition with respect to a predetermined standard comprising a control mechanism, means responsive to variations in said condition for causing actuation of said mechanism, and means governed by said mechanism for effecting application of an agent tending to correct said condition, said last named means being adapted to operate during a time interval corresponding to approximately one-quarter cycle of said control.

14. A system for effecting control of a condition comprising a control mechanism responsive to changes in said condition, means governed by said control mechanism for effecting the application of an agent tending to control said condition and means for displacing the control period with respect to variations of said condition without changing the amount of said agent applied.

15. A system for effecting control of a condition comprising a control mechanism responsive to changes in said condition, means governed by said control mechanism for effecting the application of an agent tending to change the magnitude of said condition, and means associated with said governed means for rendering said control inactive at substantially the point of maximum departure of said condition from its normal value.

16. A system for effecting control of a condition comprising a control mechanism responsive to changes in said condition, means governed by said control mechanism for effecting the application of an agent tending to change the magnitude of said condition, and means associated with said governed means for discontinuing the application of said agent after a time interval of approximately half the time of departure of the condition from its predetermined or normal standard.

17. A system for effecting control of a condition comprising a control mechanism responsive to changes in said condition, means governed by said control mechanism for effecting the application of an agent tending to change the magnitude of said condition, and adjustable means associated with said governed means for initiating and maintaining effective a control during movement of said control mechanism in a given direction and until reversal of the same.

18. A system for effecting control of an ion concentration of a solution comprising a control mechanism responsive to changes in ion concentration, means governed by said control mechanism for effecting the application of an agent tending to change the degree of ion concentration of said solution, and means associated with said governed means for rendering said control inactive at substantially the point of maximum departure of said ion concentration from its normal value.

19. A system for effecting control of an ion concentration of a solution comprising a control mechanism responsive to changes in ion concentration, means governed by said control mechanism for effecting the application of an agent tending to change the degree of ion concentration of said solution, and means energized by said governed means for controlling the application of said agent during a period of time corresponding to approximately one-quarter cycle of said control.

20. A system for effecting control of an ion concentration of a solution comprising a control mechanism responsive to changes in ion concentration, means governed by said control mechanism for effecting the application of an agent tending to change the degree of ion concentration of said solution, and a solenoid operated valve controlled by said governed means for admitting said agent to the solution in an amount proportional to the time lag of the system.

21. A system for effecting control of an ion concentration of a solution comprising a control mechanism responsive to changes in ion concentration, means governed by said control mechanism for effecting the application of an agent tending to change the degree of ion concentration of said solution, and a solenoid energized valve adapted to open and admit said agent to the solution when the ion concentration is decreasing but is still too high and to close when said concentration is increasing but is still too low.

22. In a system for effecting control of an ion concentration of a solution, electrodes comprising elements in a Wheatstone bridge disposed in said solution, a control mechanism co-operating with said Wheatstone bridge and responsive to variations in said ion concentration from a predetermined value, and means governed by said control mechanism for effecting addition of an agent to said solution and varying the ion concentration thereof, said governed means being rendered inoperative substantially at the point of reversal of said control mechanism from a maximum departure of the ion concentration from a predetermined value.

23. In a system for effecting control of an ion concentration of a solution, electrodes comprising elements in a Wheatstone bridge disposed in said solution, a control mechanism co-operating with said Wheatstone bridge and responsive to variations in said ion concentration from a predetermined value, means governed by said control mechanism for effecting addition of an agent to said solution and varying the ion concentration thereof, said governed means being rendered inoperative substantially at the point of reversal of said control mechanism from a limiting control position, and means for recording the variations of said ion concentration.

24. In a control system, means for detecting variations in a condition under control, means governed thereby for effecting change in application of a control agent to correct said condition with respect to a predetermined value, and means for discontinuing the control at substantially a maximum departure of said condition from its predetermined value, and continuing the control at a point when said condition is substantially equal to its predetermined value.

25. In a control system, means for detecting variations in a condition under control, a motor operated control member governed thereby for effecting change in application of a control agent to correct said condition with respect to a predetermined value, and means co-operating with said detecting means for actuating said motor operated member during intermittent periods substantially equal to half of the time of departure of said condition from its predetermined standard.

26. The method of effecting control of a condition having an appreciable inertia or time lag between the application of a control agent to change said condition and the detection of such change, which comprises varying the application of a control agent to correct said condition during a period substantially equal to the time during which said condition varies from a predetermined value to a maximum departure from said value, and discontinuing said control before expiration of the time lag period.

27. A system for effecting anticipatory control of a condition to effect a predetermined standard magnitude thereof comprising a control mechanism including a member whose position corresponds to the value of the condition, switching mechanism moved to circuit-controlling position during movement of said member from normal position and remaining in said position until return of said member to normal position, switching mechanism moved to one circuit-controlling position during movement of said member from normal position and to its original position upon reverse movement of said member, and means governed by said switching mechanism for varying the application of an agent tending to establish said standard magnitude of said condition.

28. In a control system, means for determining the magnitude of a controlled condition, a member moved thereby to positions corresponding to the magnitudes of said condition, switching mechanism carried thereby and actuated in accordance with the position thereof, a second member, a lost-motion driving connection between said members, switching mechanism maintained in circuit-controlling position while motion is transmitted by said connection, and means governed by said switching mechanisms for varying the application of an agent for controlling said condition.

29. A control system comprising valve structure movable from "off" to "on" position substantially immediately upon energization of actuating means therefor, means for determining the magnitude of a condition controlled by flow through said valve structure, a member moved by said means to positions corresponding to the magnitudes of said condition, switching mechanism carried thereby maintained in a circuit-controlling position for positions thereof corresponding to magnitudes other than normal, a second member, a lost-motion driving connection between said members, and switching mechanism maintained in circuit-controlling position during transmission of movement through said connection, said switching mechanisms controlling the energization of said valve actuating means.

30. In an anticipatory control system, a controller comprising means responsive to variations of a measured condition, a shaft rotated in sense and to extents depending upon the sense and magnitude of said variations, a member carried by and rotatable with said shaft, switching mechanism carried by said member and whose circuit-controlling condition is dependent upon the angular position thereof from normal, a second member loosely mounted on said shaft, a lost-motion driving connection between said members, and switching mechanism carried by one of said members maintained in a circuit-controlling condition during transmission of movement by said connection and in another circuit-controlling condition during relative movement of said members.

HENRY C. PARKER.